Sept. 18, 1923.   J. GOODMAN   1,468,150
ELECTRIC MOTOR
Filed Aug. 16, 1920   2 Sheets-Sheet 1

Sept. 18, 1923.  J. GOODMAN  1,468,150
ELECTRIC MOTOR
Filed Aug. 16, 1920   2 Sheets-Sheet 2

Witnesses:

Inventor
Jacob Goodman
His Attorney

Patented Sept. 18, 1923.

1,468,150

UNITED STATES PATENT OFFICE.

JACOB GOODMAN, OF CHICAGO, ILLINOIS.

ELECTRIC MOTOR.

Application filed August 16, 1920. Serial No. 403,689.

*To all whom it may concern:*

Be it known that I, JACOB GOODMAN, a former subject of the Czar of Russia, having declared my intention to become a citizen of the United States, and a resident of the city of Chicago, county of Cook, and State of Illinois, have invented certain new and useful Improvements in Electric Motors, of which the following is a specification.

My invention relates to improvements in electric motors and has for its object the provision of an improved construction of this character which is of simple construction, efficient in operation and capable of economical manufacture.

Other objects will appear hereinafter.

The invention consists in the combinations and arrangements of parts hereinafter described and claimed.

The invention will be best understood by reference to the accompanying drawings forming a part of this specification, and in which, Fig. 1 is a vertical transverse section of a member embodying the invention and in which the electric circuits employed have been illustrated diagrammatically.

Figure 1:
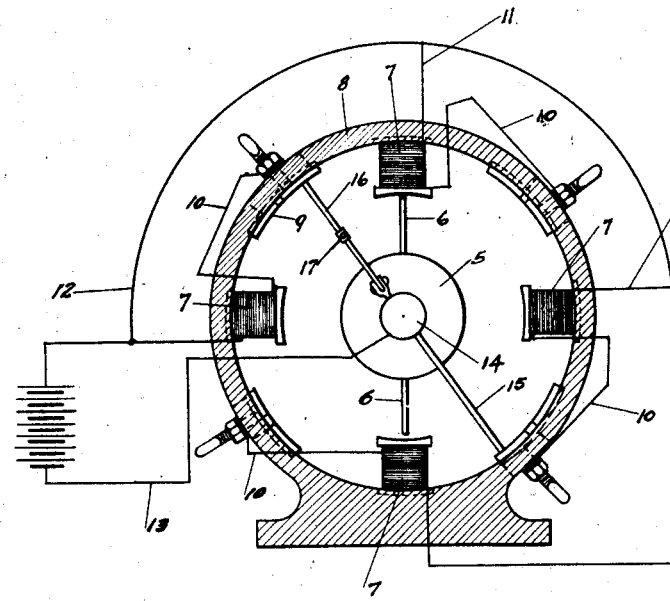
Figure 2:
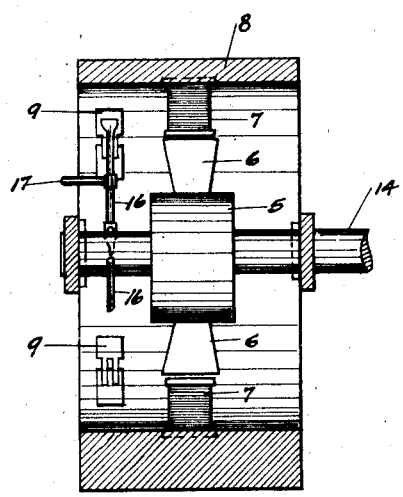
Fig. 2 is a vertical section at right angles to Fig. 1.

The form of construction illustrated in Figs. 1 and 2 comprises an armature body 5, having radiating blades 6, mounted thereon. The blades 6, are diametrically disposed and composed of soft iron or other magnetically susceptible material capable of acquiring and losing magnetism. A plurality of field magnet coils 7, are arranged around the armature 5, being secured on the inner periphery of a casing 8, and insulated therefrom as shown. Electric contact members 9, are arranged on the inner periphery of casing 8, between the field coils 7. The contacts 9, are arranged to be capable of circumferential extension or contraction as shown. Each contact 9, is connected by a wire 10, with the corresponding field coil 7, and each of the field coils 7, is connected by another wire 11, with wire 12, of the main circuit. The other wire 13 of the main circuit is connected directly with the armature shaft 14, by any suitable means as through a bearing for said shaft, said bearing being insulated from the frame, which in turn carries radiating contact fingers 15 and 16, adapted and arranged to make contact with the contact members 9, during revolutions of said armature shaft. One of the said contact fingers 16, is pivotally mounted on the armature shaft and equipped with a handle 17, whereby it may be adjusted into and out of operative relation with the contacts 9.

The arrangement is such that when current is supplied through the wires 12 and 13, the armature 5, will be caused to revolve. Each field magnet 7, being excited as each armature member 6, approaches the same and demagnetized as each member 6 passes the same as will be readily understood by those skilled in the art. By circumferentially extending the contacts 9, the periods during which current is supplied to the field magnets may be prolonged thus increasing the power of the motor if desired. Upon reduction of the length of said contacts, the power may be reduced. Likewise, by adjusting finger 16 into and out of the path of the contacts 9, the power of the motor may also be increased or decreased as desired. By this arrangement a simple and effective electric motor may be provided capable of economical manufacture.

Figure 3:
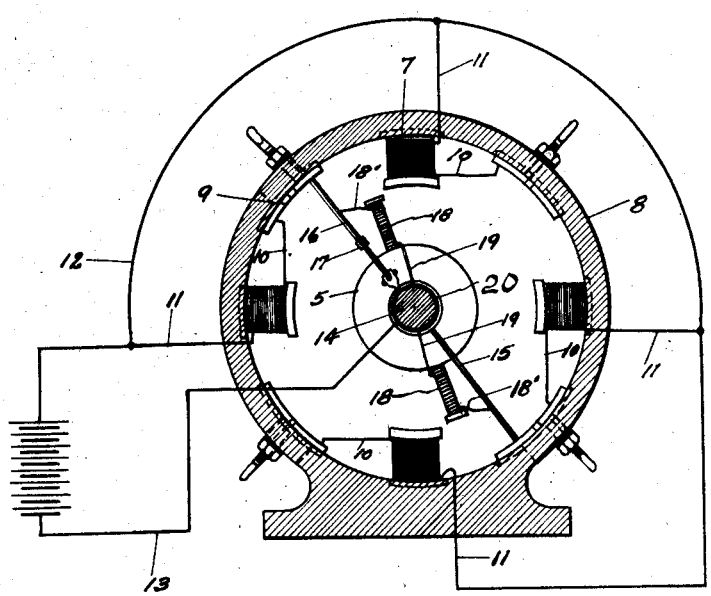
Fig. 3 is a view similar to Fig. 1 of a modified form of construction.
Figure 4:
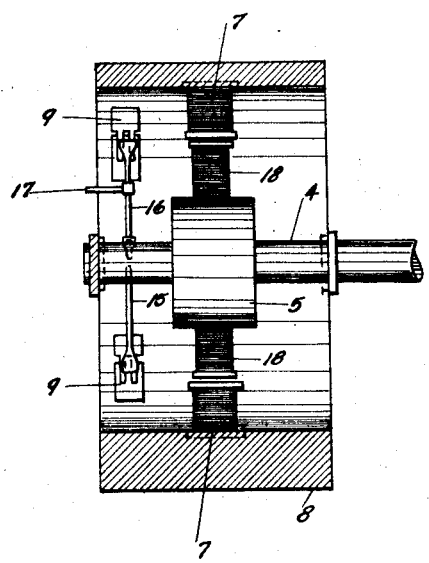
Fig. 4 is a view similar to Fig. 2 of the form of construction illustrated in Fig. 3.

In the modified form of construction illustrated in Figs. 3 and 4, I have substituted wound armature coils 18 on the soft iron members 6 of the previously described construction. Each of these coils is connected by one wire 18', with the adjacent contact finger 15 or 16 and also by wires 19 with the armature shaft 14. The fingers 15 and 16 are mounted on a ring or band 20, insulated from armature shaft 14, and wire 13 is connected with ring 20, so that when one of the contact fingers makes contact with one of the contact blades 9, the corresponding armature coil 18 is excited and the corresponding field magnet coil 7 is also excited. In this way a more powerful motor is produced requiring, of course, the consumption of more electrical energy. Otherwise the modified form of construction is identical with that already described.

While I have illustrated and described the preferred form of construction for carrying my invention into effect, this is capable of variation and modification without departing from the spirit of the invention.

I, therefore, do not wish to be limited to the precise details of the construction set forth, but desire to avail myself of such variations and modification as come within the scope of the appended claims.

Having described my invention, what I claim as new and desire to secure by Letters Patent, is:

1. An electric motor comprising a revoluble armature; a plurality of field magnets surrounding said armature; and contact means for said magnets, having adjustable operative surfaces, substantially as described.

2. An electric motor comprising a revoluble armature; a plurality of field magnets surrounding said armature; contact means for said magents having adjustable operative surfaces; and a plurality of other contact means a minority of which are adjustable out of contact with said first contact means, substantially as described.

3. An electric motor comprising a revoluble armature; a plurality of field magnets surrounding said armature; circuits for said field magnets; a plurality of contact members on said armature; and adjustable means permitting movement of a contact member to operative or inoperative position to vary the speed of the motor, substantially as described.

4. An electric motor comprising a revoluble armature having a magnetically susceptible member thereon; a plurality of field magnets surrounding said armature; circuits for said magnets; an adjustable contact for each of said circuits to vary the period of energization thereof; and means revolving with said armature for successively opening and closing said circuits, substantially as described.

5. An electric motor comprising an armature shaft; an armature mounted on said shaft; members radiating from the body of said armature and composed of magnetically susceptible material; a casing surrounding said armature; a plurality of field magnets mounted on said casing and surrounding said armature; circuits for said magnets; adjustable contacts for each of said circuits mounted on said casing and adapted to vary the period of energization thereof; and adjustable contact fingers carried by said shaft and cooperating with said contacts to successively open and close the circuits through said field magnets, substantially as described.

6. An electric motor comprising an armature shaft; an armature on said shaft and having two radiating armature coils thereon; a plurality of field magnets surrounding said armature; circuits for said field magnets and said coils; adjustable contacts in said circuits for varying the period of energization thereof; and means for simultaneously opening and closing the circuits through said field magnets and said coils, substantially as described.

7. An electric motor comprising an armature shaft; an armature mounted on said shaft; diametrically disposed members radiating from the body of said armature and composed of magnetically susceptible material; a casing surrounding said armature; a plurality of spaced field magnets mounted on the inner periphery of said casing and surrounding said armature; contacts disposed on said casing between said field magnets; circuits connecting said field magnets and said contacts; and an adjustable finger mounted on said shaft and revolving therewith and co-operating with said contacts to successively energize related field magnets, substantially as described.

8. An electric motor comprising a revoluble armature; a field magnet disposed adjacent thereto; and an extensible-contractible contact mounted adjacent said field magnet for providing different constant motor capacities, substantially as described.

9. An electric motor comprising an armature shaft; an armature mounted on said shaft; field magnets disposed about said armature; a plurality of fingers mounted on said shaft and revoluble therewith adapted to energize related field magnets, a minority of said fingers being adjustable into and out of operative position, substantially as described.

10. An electric motor comprising an armature shaft; magnets mounted on said armature; field magnets disposed about said armature; adjustable contact members mounted on said shaft and movable therewith; and a circuit connecting said field magnets, said armature magnets, and said adjustable contact members, substantially as described.

11. An electric motor comprising an armature shaft; magnets mounted on said armature; field magnets disposed about said armature; adjustable contact members mounted on said shaft and movable therewith; and a circuit connecting said field magnets, said armature magnets and said adjustable contact members, the connection between said armature magnet and said contact member being flexible to permit adjustment thereof, substantially as described.

In testimony whereof I have signed my name to this specification in the presence of two subscribing witnesses.

JACOB GOODMAN.

Witnesses:
 JOSHUA R. H. POTTS,
 B. G. RICHARDS.